United States Patent [19]
Golden

[11] 3,965,539
[45] June 29, 1976

[54] PORTABLE, RELEASABLE TIE-DOWN DEVICE AND METHOD

[76] Inventor: Steven T. Golden, 822 Teague Drive, Santa Paula, Calif. 93060

[22] Filed: June 30, 1975

[21] Appl. No.: 591,461

[52] U.S. Cl. .................................. 24/71.3; 24/71.2
[51] Int. Cl.² .................... A43C 11/00; A44B 21/00
[58] Field of Search ................. 254/51, 52; 24/71.2, 24/71.3, 68 R, 68 CD, 68 BT, 68 D, 69 R, 71 ST, 265 CD

[56] References Cited
UNITED STATES PATENTS

| | | | |
|---|---|---|---|
| 830,966 | 9/1906 | Campbell | 24/71.2 X |
| 1,586,174 | 5/1926 | Bell | 24/71.3 |
| 2,577,212 | 12/1951 | Scheuerlein | 24/71.3 |
| 3,252,189 | 5/1966 | Kanneworff et al. | 24/71.3 |
| 3,874,638 | 4/1975 | Berg et al. | 254/51 |

*Primary Examiner*—G. V. Larkin
*Attorney, Agent, or Firm*—Poms, Smith, Lande & Glenny

[57] ABSTRACT

A portable, releasable tie-down device and method for quickly and easily applying tension to a flexible elongated member such as a belt, strap, cable, rope or the like when the ends thereof are either free or tied down. The device enables an elongated member to be tensioned without the necessity of releasing the tied-down ends. Either the end portions of one or more flexible elongated members or a midportion of a single elongated member are wrapped into overlapping relationship, thereby tensioning the flexible elongated member. The flexible elongated member may be maintained under tension until it is desired to relieve such tension. Subsequently, the flexible elongated member may be quickly and easily relieved of tension and the device may be totally removed from engagement with the flexible elongated member. The device may include a removable handle which, after being used to crank up the device to tension the elongated member, may be removed while retaining the member under tension, then replaced when desired to untension the member.

17 Claims, 12 Drawing Figures

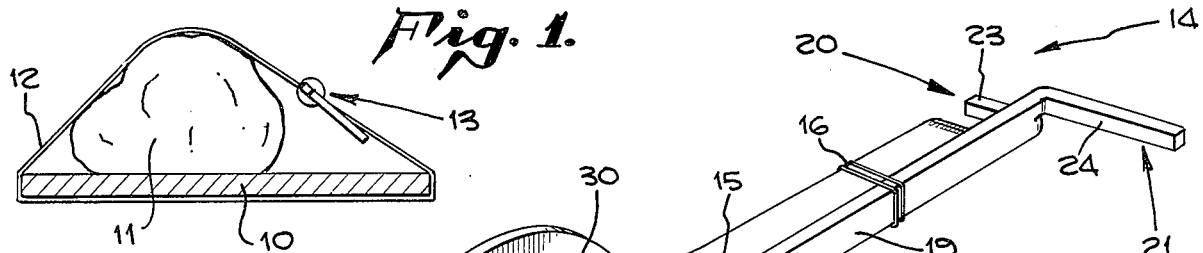
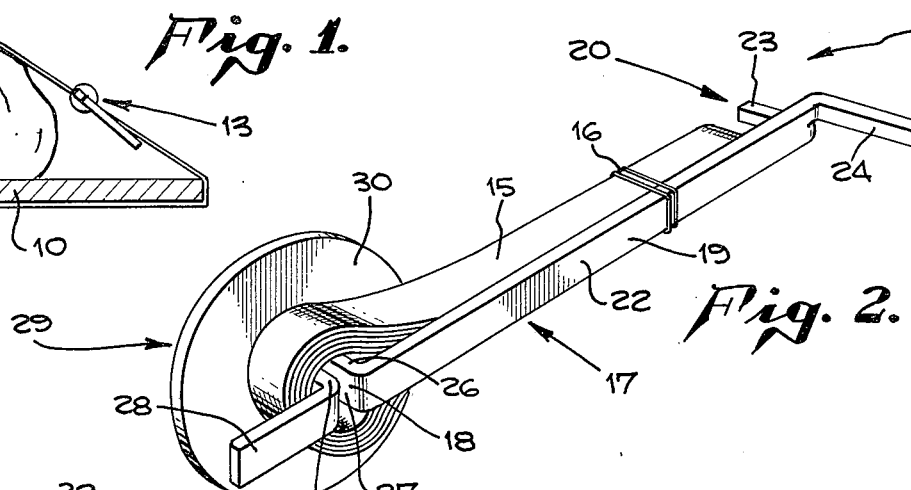
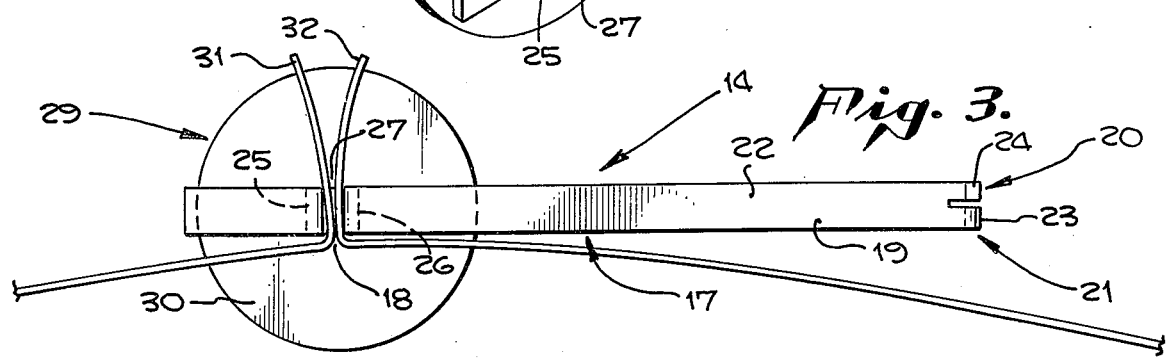
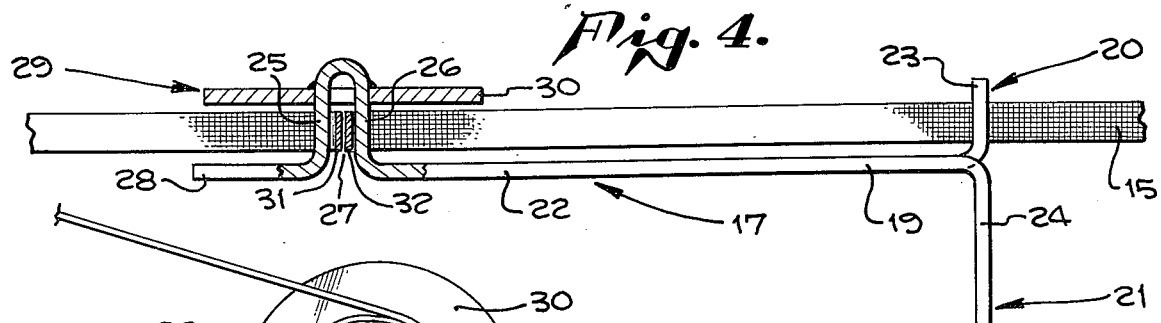
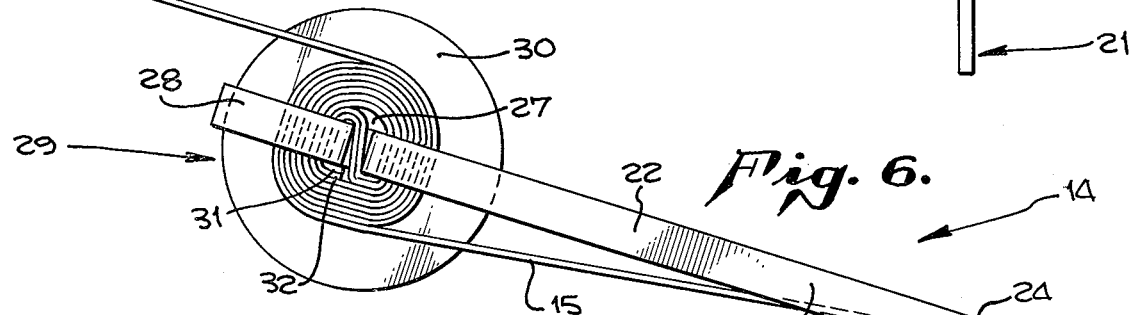
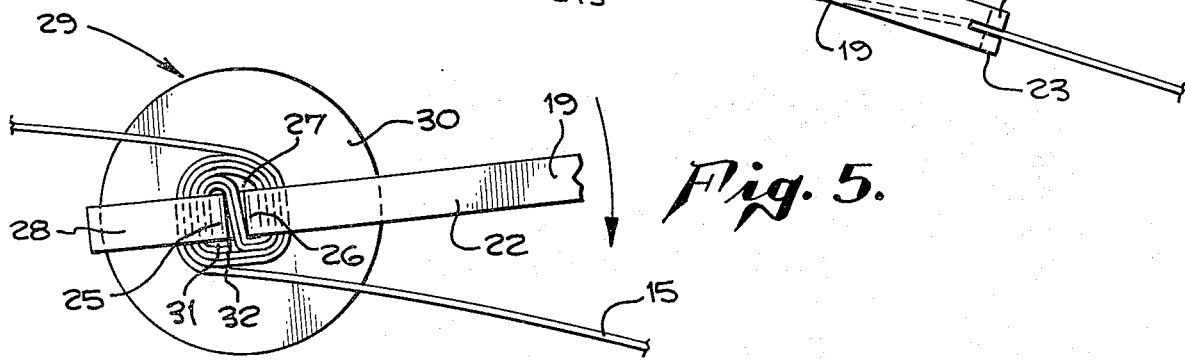

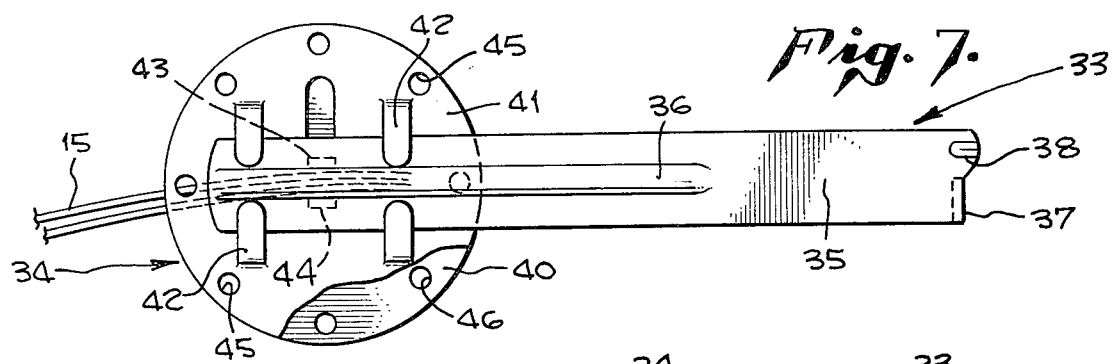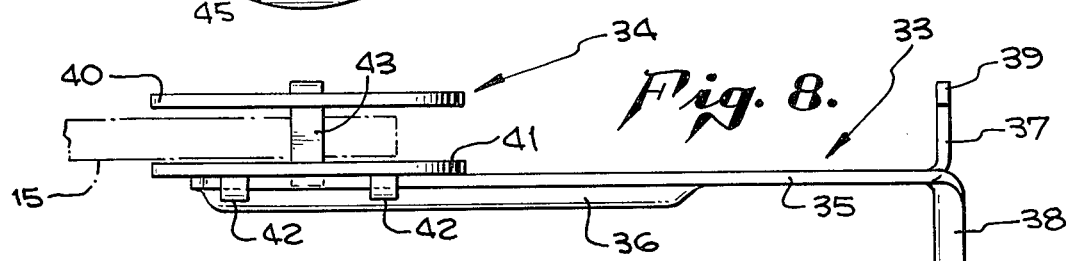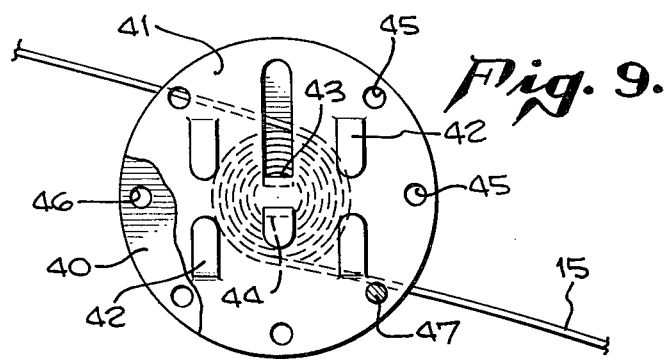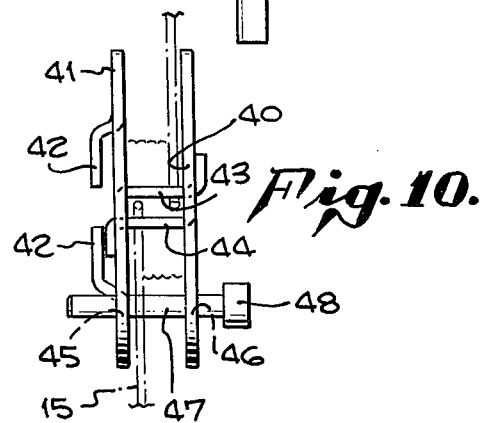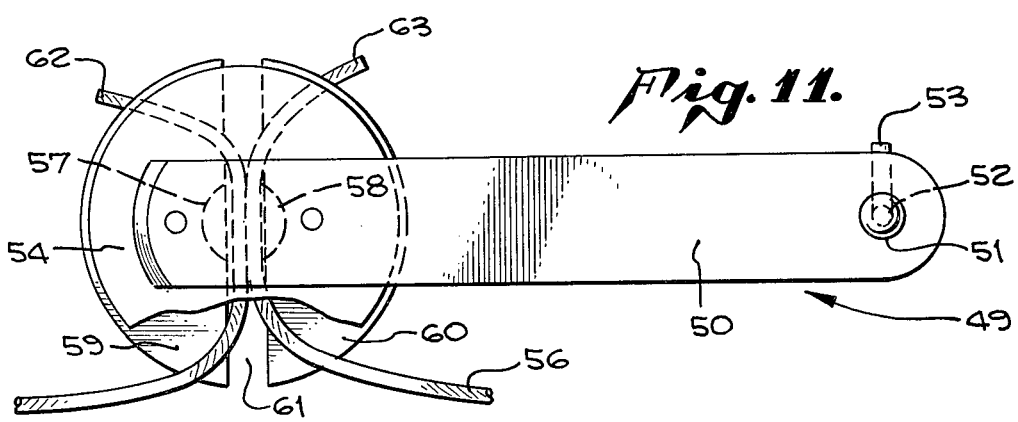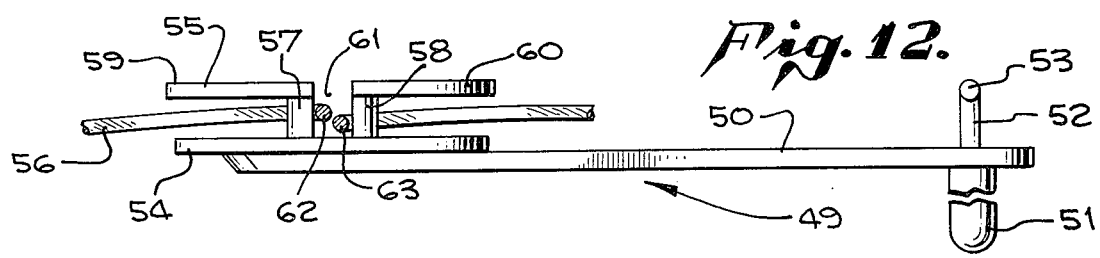

PORTABLE, RELEASABLE TIE-DOWN DEVICE AND METHOD

BACKGROUND OF THE INVENTION

1. Field of the Invention

The invention relates to tie-down devices; and, more particularly, to a portable, releasable device and method of using the same for tensioning a flexible, elongated member such as a belt, strap, cable, rope or the like and subsequently quickly and easily relieving such tension.

2. Description of the Prior Art

Various devices and techniques have been proposed in the past for tieing down loads or the like using flexible, elongated members, such as ropes, belts, cables, straps or the like. For example, a load may be placed on top of a vehicle or on a truck bed or the like and the rope is passed over the load. The free ends of the rope may then be tied down, as for example, to each other, the truck bed or vehicle itself, etc.. Complicated and relatively expensive devices have been proposed to tension such a rope without using knots or mechanical devices. For example, pulleys or winches, which require a fixed base, have been suggested to tension the rope so that the load is firmly held in position. In addition to being expensive and difficult to use, means must be provided for fixedly securing the pulley or winch in position. Thus, it is difficult to use such devices in differing locations.

Accordingly, there is a need for a relatively simple and easy-to-use portable device which may be used to tension a rope, belt, strap or the like.

SUMMARY OF THE INVENTION

It is an object of this invention to provide a portable, releasable tie-down device and method for tensioning a rope or the like.

It is a further object of this invention to provide such device and method which can be used at the free ends of a rope or the like, intermediate the tied-down ends of the rope or the like or on two separate ropes or the like, intermediate the tied-down ends of the rope or the like, or on two separate ropes or the like.

It is still another object of this invention to provide such a device and method whereby the tensioned rope or the like may be quickly and easily relieved of tension.

It is yet another object of this invention to provide such a device and method whereby leverage may be provided to tension the rope or the like, with the means for providing the leverage being removable while keeping the rope tensioned, then replaced when desired.

These and other objects are preferably accomplished by providing a portable, releasable tie-down device and method for quickly and easily applying tension to a flexible elongated member such as a belt, strap, cable, rope or the like when the ends thereof are either free or tied down. The device enables the flexible elongated member to be tensioned without the necessity of releasing the tied-down ends. The flexible elongated member is wrapped into overlapping relationship thereby tensioning the flexible elongated member. The flexible elongated member may be maintained under tension until it is desired to relieve such tension. Subsequently, the flexible elongated member may be quickly and easily relieved of tension and the device may be totally removed from engagement with the flexible elongated member.

BRIEF DESCRIPTION OF THE DRAWING

FIG. 1 is a vertical view, partly in sectional, showing a load tensioned in accordance with the teachings of my invention;

FIG. 2 is a perspective view of a first embodiment of a tie-down device in accordance with the teachings of my invention;

FIG. 3 is a vertical view showing the device of FIG. 2 in operation;

FIG. 4 is a side view, partly in section, of the device of FIG. 3;

FIG. 5 is a vertical view, similar to a portion of FIG. 3, showing the winding of the strap;

FIG. 6 is a vertical view showing the strap of FIG. 6 fully wound and the device in tension-retaining position;

FIG. 7 is a vertical view of a second embodiment of a tie-down device in accordance with the teachings of my invention;

FIG. 8 is a side view of the embodiment of FIG. 7;

FIG. 9 is a vertical view, similar to FIG. 7, showing the handle portion removed;

FIG. 10 is an end view of the embodiment of FIG. 9 showing a tension-retaining feature of this embodiment;

FIG. 11 is a vertical view of a third embodiment of the tie-down device of the invention; and FIG. 12 is a side view of the embodiment of FIG. 11.

DESCRIPTION OF THE PREFERRED EMBODIMENTS

Referring now to FIG. 1 of the drawing, a truck bed 10 or the like is shown having a load 11 disposed thereon. A belt or strap 12 encircles the load, passing under the bed 10, and has its free ends secured by a tie-down device 13 in accordance with this invention. As will be discussed, various embodiments of tie-down devices may be used to tie down the load of FIG. 1 in accordance with this invention. Further, although certain elongated flexible members, such as ropes, belts, straps, cables and the like may be subsequently discussed, the invention is applicable to any elongated flexible member capable of being tensioned.

The bed 10 of course is exemplary of other environments, such as a pallet, the roof of a vehicle, etc. Finally, the device 13 may be used on separate straps or belts 12, on the free ends of the strap or belt 12, or intermediate the free ends thereof as will be discussed. That is, the strap or belt 12 may be tied down under the bed 10, for example, or on each side thereof, as to the vehicle or the like, with the device 13 then inserted or placed on the strap or belt 12 intermediate the tied-down ends.

Referring now to the embodiment of FIGS. 2 through 6, as particularly contemplated by the invention, a tie-down device 14 is shown in FIG. 2 in packaged form as including a belt or strap 15 which is wrapped around the device 14 and secured thereto as by a rubber band 16. The strap 15 plus band 16 form no part of the invention since any strap or belt may be used as long as it is of a suitable width.

Thus, as particularly contemplated in the present invention, device 14 includes belt storing or tensioning means 17 for applying tension to the belt 15 by storing the belt 15 under tension. In the exemplary embodiment, tensioning means 17 includes belt receiving means 18 for receiving a portion of the belt 15 thereon and handle means 19 for rotating the belt receiving means 18 in a non-interfering relationship to belt 15 during rotation thereof as will be discussed shortly. Thus, handle means 19 provides sufficient leverage for rotating the belt 15.

Also, as particularly contemplated in the present invention, tension retaining means 20 are provided for retaining belt 15 in a tensioned state by preventing contra-rotation of the member receiving means 18 and tension releasing means 21 for quickly and easily releasing the tensioned belt 15. In the exemplary embodiment, handle means 19 includes a handle portion 22, which, in the first embodiment of the invention, is integral with the belt receiving means 18. Tension retaining means 20 comprises, in the exemplary embodiment, a lip portion 23, bent or otherwise integral with the free end of handle portion 22. As will be discussed, lip portion 23 extends from the same side of handle portion 22 as the belt receiving means 18, may extend generally normal to the longitudinal axis of handle portion 22 and may be angled slightly upwardly (or provided with a tab or the like—not shown—for preventing lateral movement as will be discussed).

In the exemplary embodiment, tension releasing means 21 may comprise a release member 24 extending from the side of handle portion 22 opposite lip portion 23 and may extend generally normal to the longitudinal axis of handle portion 22.

Belt receiving means 18, in the exemplary embodiment, may include a pair of spaced flanges 25, 26 forming an open slot 27, slot 27 opening on the same side of handle portion 22 as release member 24. As shown in FIG. 4, flange 26 may be formed by bending handle portion 22 generally normal to the longitudinal axis of handle portion 22, then about itself and generally parallel to flange 26 but spaced therefrom to form flange 25, then again generally coincident with the longitudinal axis of handle portion 22 to form an abutment member 28 which is an extension of handle portion 22. In this manner, slot 27, abutment member 28 (which, as will be discussed, serves to retain belt 13 on device 14 in a manner preventing lateral movement thereof), flanges 25, 26 (which, as will also be discussed, provide an axis for wrapping belt 15 thereon), handle portion 22, the tension retaining means 20 and the tensioning releasing means 21 may all be stamped or otherwise formed from a single piece of metallic material, such as aluminum or the like.

Finally, belt retaining means 29 may be provided for retaining belt 15 in wrapped, overlapping position on flanges 25, 26. In the exemplary embodiment, such belt retaining means 29 includes the aforementioned abutment member 28, the adjacent portion of handle portion 22 and a flange member 30 which may be a disc-shaped member or the like fixedly secured to flanges 25, 26 at their intersection. Flange member 30, as clearly shown in FIG. 4, is spaced from abutment member 28 and handle portion 22 a distance at least the same as the width of belt 15. Slot 27 is also at least as wide as double the thickness of belt 15.

The use of the tie-down device 14 of FIGS. 2 through 6 will now be described. The free ends 31, 32 of belt 15, as shown in FIG. 3, are inserted into slot 27. Although the operation will now be described with respect to overlapping ends 31, 32 obviously the device 14 may be used anywhere on belt 15. That is, a single portion of belt 15 may be inserted into slot 27 and the foregoing operations subsequently carried out. Also, belt 15 may be a single piece of flexible elongated material or two pieces joined elsewhere and having ends terminating as ends 31, 32.

FIG. 4 shows the position of device 14 with ends 31, 32 in slot 27 prior to rotation. It can be seen that handle portion 22 does not interfere with the rotation of belt 15 on itself. Thus, as shown in FIG. 5, handle portion 22 is rotated in the direction of the arrow thus winding belt 15 into overlapping relationship about flanges 25, 26. Abutment member 28, the adjacent contacting portion of handle portion 22 and the flange member 30 serve to retain the overlapped portions of belt 15 from lateral movement off of flanges 25, 26. That is, the abutment member 28 is long enough and flange member 30 is wide enough to retain a significant amount of overlapped portion of belt 15 thereon as shown in FIG. 6. This is the position for tensioning belt 15. Thus, handle portion 22 has a tendency to rotate in a direction opposite the direction of the arrow in FIG. 5. However, insertion of lip portion 23 under belt 15 serves to prevent such rotation thus maintaining belt 15 under tension. When it is desired to release such stored tension, release member 24 may be grasped to pull lip portion 23 from abutting relationship to belt 15 and the handle portion 22 is then free to be rotated in a direction to release the stored tension (that is, in a direction opposite the direction of the arrow in FIG. 5).

Referring now to the embodiment of FIGS. 7 through 10 wherein like numerals refer to like parts of the embodiment of FIGS. 2 through 6, in the exemplary embodiment of the invention, handle means 33 may be separable or otherwise removable from the belt receiving means 34. As particularly contemplated in the invention, such handle means 33 includes an elongated handle portion 35 having a raised portion 36 extending along at least a portion thereof. Lip portion 37 is similar to lip portion 23 of the device of FIGS. 2 through 6 release member 38 is similar to release member 24 of the device of FIGS. 2 through 6. Lip portion 37 may have an upwardly extending tab 39 at its free end as shown in FIG. 8 for preventing lateral movement of belt 15.

As particularly contemplated in this embodiment of the invention, belt receiving means 34 includes a flange member 40 similar to flange member 30 of the embodiment of FIGS. 2 through 6 (see FIG. 8). However, in place of abutment member 28 and the aforementioned portion of handle portion 22 adjacent the overlapping portion of belt 15, a second flange member 41 is provided. Flange member 41 includes means thereon for removably attaching handle portion 35 thereto. In the exemplary embodiment, such means includes a plurality of spaced inwardly extending raised flanges 42 which may be stamped from or otherwise formed on flange member 41. These flanges 42 are spaced to receive the width of handle portion 35 therein as shown in FIG. 7, the raised portion 36 of handle portion 35 acting as a stop when in engagement with flanges 42. Thus, handle portion 35 can be quickly and easily inserted onto flange member 41 and subsequently removed therefrom, when desired. Although only flange member 41 is illustrated as having flanges 42 thereon, obviously flange member 40 may also be provided with such flanges so that handle portion 35 may be inserted onto either flange member 40 or 41.

In this embodiment of the invention, both flange members 40 and 41 act as lateral retaining means for belt 15. Further, the slot 27 of the embodiment of FIGS. 2 through 6 is eliminated with the flange members 40 and 41 interconnected by a pair of spaced flanges 43, 44 (see particularly FIG. 10). Thus, the operation of the embodiment of FIGS. 7 through 10 is identical to that of the embodiment of FIGS. 2 through 6 other than that belt 15 is threaded or otherwise fed between flanges 43, 44. However, as particularly contemplated by the present embodiment of the invention, tensioning retaining means, which includes lip portion 37 and tab 39, also includes a plurality of spaced apertures 45 extending about the periphery of flange member 41. Similar apertures 46, laterally aligned with apertures 45, also extend about the periphery of flange member 40 (see FIG. 10). A removable member such as a wire or pin 47 may be inserted in any suitable pair of aligned apertures 45, 46 as shown in FIG. 10 after the belt 15 is retained in tension via lip portion 37 and tab 39 as heretofore described with respect to FIG. 6. At this point, handle portion 35 may be removed from flange member 41 (see FIG. 9) and the belt 15 abuts against pin 47, which pin 47 has an enlarged end or head 48, thus maintaining belt 15 under tension also as shown in FIG. 9. When it is desired to release the tension on belt 15, handle portion 35 is re-inserted onto flange member 41, as shown in FIG. 7, and pin 47 is removed and the belt 15 is relieved of tension as heretofore described. Thus, handle portion 35 may be removed while the belt 15 is maintained under tension and there is no possibility of belt 15 unwinding.

A third embodiment of the invention is shown in FIGS. 11 and 12 wherein like numerals refer to the embodiments of FIGS. 2 through 10.

In this embodiment, handle means 49 includes a handle portion 50 having a release member 51 (similar in function to release members 24, 38) and retention retaining means in the form of a lip portion 52 (similar in function to lip portions 23, 37). As can be seen particularly in FIG. 12, lip portion 52 is bent or otherwise extends upwardly at 53 to retain belt 15 thereon (thus, similar in function to tab 39).

In this embodiment of the invention, handle portion 50 is fixedly secured to flange member 54 (which flange member is similar to flange member 41 of the embodiment of FIGS. 7 through 10). Of course, such handle portion 50 may be removable from flange member 54, if desired, in the same manner as described hereinabove with regard to the embodiment of FIGS. 7 through 10.

Again, as in the FIGS. 7 through 10 embodiment, the flange member 54 cooperates with a spaced flange member 55 to act as lateral retaining means for rope or cable 56 (although a belt may also be used with this embodiment, a rope or cable is disclosed). Flange member 55 is comprised of a pair of spaced flange portions 59, 60 forming a slot 61 therebetween. Slot 61 extends the entire diameter of flange member 55 and flanges 57, 58 are integrally connected to flange portions 59, 60, respectively. Thus, the free ends 62, 63 of rope or cable 56 may be placed into slot 61 as heretofore described with respect to the embodiment of FIG. 3. The slot 61 is preferably at least as wide as twice the diameter or thickness of rope or cable 56. The operation and use of the embodiment of FIGS. 11 and 12 is identical to that of the embodiment of FIGS. 2 through 6 and no further discussion is necessary. It can be seen, therefore, that this embodiment of FIGS. 11 and 12 is particularly suited for winding and tensioning cables, ropes or the like.

It can be seen that I have disclosed a simple and completely portable and inexpensive device and method for allowing a user to tie down a load and induce tension on a rope, strap, belt, or the like without using knots or mechanical devices such as pulleys or winches. The tension induced is in direct proportion to the length of the lever arm or handle portions of the various embodiments and the strength of the user. It will be readily understood that with an elongated flexible member receiving means of 1 inch in diameter and a handle portion or leverage arm of 10 inches, a theoretical 10 to 1 leverage may be generated. This actually is only 5 to 1 because the rope or belt is moving toward the device from both ends. By using a slot that allows lateral movement of the two rope ends, any amount of tension may be generated for each one-half turn of the leverage arm.

Thus, if a tension of 100 lbs. were desired when the device is parallel with the rope and in the locking position and it was found by trial that this tension was induced at a position when the lever arm is at 45° from the locking position, then the lever arm would be counter-rotated to the slack position and enough slack pulled back in the rope or belt or the like to allow the lever arm to be rotated 45° farther than previously. The required slack would be approximately one-half the diameter of the belt receiving means providing that the slack is pulled in only one of the two rope ends.

It should be obvious from the above that an infinite variation in force or tension may be applied using one-half turn of the embodiments of this invention to induce that tension limited only by the length of the lever arm or handle portion and the force applied to the same.

Because this infinite variation may be applied, it is obvious that the embodiments of my invention may, in addition to relatively flexible members, be used to apply tension to flat steel strapping or steel cable or steel wire such as baling wire where very little stretch of the material is possible.

If used with a rope as in the FIG. 11 embodiment, the groove that the rope rides in is preferably substantially the same size as the rope and the flanges are extended enough to keep the rope winding up evenly with one rope end (or other rope) locking the rope under it in position, the flanges keeping the lever arm or handle portion from rotating around the lateral axis.

In summary, my invention may be used to tension elongated flexible members where both ends are either free or tied down. In the various embodiments, the flange members either extend a distance out from the hub to keep the rope (or other elongated member) ends on top of each other or have a width of one rope diameter (or elongated member width) with a flange diameter extending far enough to contact the rope (or other elongated member) being tightened and therefore stopping the lateral rotation of the flexible elongated member receiving means.

The handle portions provide a leverage arm attached to the elongated member receiving means to rotate the same on the vertical axis. The elongated member receiving means may be locked against counter-rotation when the elongated member receiving means has been cranked up to the tension desired. It will be obvious that the above comments apply to flat webbing or strapping as well as rope or similar flexible elongated members. By having a removable handle as in FIG. 7 embodiment, and apertures in the periphery of the flange members, a wire, pin, or other suitable means may be inserted in one set of aligned apertures to keep the device from counter-rotation. The handle portion then may be removed until it is desired to relieve the tension.

I claim:
1. A portable, releasable tie-down device for quickly and easily applying tension to a flexible elongated member such as a belt, strap, cable, rope or the like, said device comprising:
flexible elongated member storing means for storing said flexible elongated member thereon in overlapping relationship, said storing means including flexible elongated member receiving means adapted to receive thereon a portion of said flexible elongated member, and handle means operatively connected to said member receiving means for rotating said member receiving means, in a non-interfering relationship to said flexible elongated member during rotation of said member receiving means, in a direction adapted to wind said flexible elongated member thereon in overlapping relationship;
contra-rotation preventing means associated with said storing means for preventing rotation of said member receiving means in an unwinding direction when said flexible elongated member is wound in an overlapping relationship on said member receiving means; and
releasing means associated with said storing means for quickly and easily releasing said contra-rotation preventing means to thereby release said member receiving means for rotation in the unwinding direction.

2. The device of claim 1 wherein said member receiving means includes flexible elongated member retaining means thereof for preventing movement of said flexible elongated member in a direction generally normal to the plane or rotation of said member receiving means.

3. The device of claim 2 wherein said handle means is an elongated handle member extending in a direction generally normal to the axis of rotation of said member receiving means and said member retaining means includes a flange member lying in a plane generally parallel to the plane of rotation of said member receiving means and spaced from said handle member and said member receiving portion includes a pair of spaced generally parallel flanges operatively connected to both said flange member and one side of said elongated handle member, the spacing between said handle member and said flange member being at least as wide as said flexible elongated member.

4. The device of claim 3 wherein said contra-rotation preventing means includes an elongated lip portion integral with said elongated handle member spaced from said member receiving means extending from the same side of said elongated handle member as said member receiving portion and at an angle to the longitudinal axis of said elongated handle member.

5. The device of claim 4 wherein said elongated lip portion extends in a direction generally normal to the longitudinal axis of said elongated handle member and is angled upwardly thereto.

6. The device of claim 4 wherein said releasing means includes a release member integral with said elongated handle member spaced from the axis of rotation of said member receiving means and extending in a direction opposite said lip portion.

7. The device of claim 2 wherein said elongated handle member is removably mounted on said receiving means and extending in a direction generally normal to the axis of rotation of said member receiving means when mounted thereon, and said member receiving portion includes a pair of spaced flange members each lying in a plane generally parallel to the plane of rotation of said member receiving means and interconnected by said spaced flanges, the spacing between said flange members being at least as wide as the width of said elongated flexible member.

8. The device of claim 7 wherein both of said spaced flange members include elongated handle member receiving means thereon for receiving one end of said elongated handle member therein in releasable relationship thereto.

9. The device of claim 8 wherein said contra-rotation preventing means includes said spaced flange members including at least one removable pin receiving aperture in each spaced flange member, said apertures being laterally aligned.

10. The device of claim 6 wherein said spaced flanges form a slot opening on the side of said elongated member opposite said one side, said slot being at least as wide as the thickness of said flexible elongated member.

11. The device of claim 6 wherein each of said flanges includes second and third spaced flange members lying in the same plane and in a plane generally parallel to the plane of rotation of said member receiving means, and said second and third flange members being spaced from each other forming an elongated slot therebetween, said slot extending in a direction lying in the same plane as the plane of rotation of said member receiving means and said slot being approximately at least twice the width as the width of said flexible elongated member.

12. An article of commerce comprising
a single strip of metallic material having a first elongated portion, a second elongated portion extending in a direction generally normal to the longitudinal axis of said first elongated portion, said second elongated portion bending about itself to form a third elongated portion extending generally parallel to said second elongated portion, said third elongated portion bending about itself to form a fourth elongated portion, said fourth elongated portion having its longitudinal axis generally coincident with the longitudinal axis of said first portion, said fourth elongated portion terminating in a pair of bent tabs, each of said tabs having a longitudinal axis extending generally normal to the longitudinal axis of said fourth elongated portions and bent in opposite directions, the tab extending on the same side of said strip as said second and third elongated portions being bent slightly upwardly; and
a flange fixedly secured to the intersection of said second and third elongated portions, said flange being substantially wider than the width of said strip and lying in a plane extending generally normal to the longitudinal axis of said second and third elongated portions and extending on both sides thereof.

13. A method for quickly and easily applying tension to a flexible elongated member such as a belt, strap, cable, rope or the like when said flexible elongated member is tied down at each end thereof and quickly and easily releasing stored tension therefrom wherein said method includes an elongated handle member terminating at one end in a flexible elongated member receiving portion on one side of said handle member and at the other end in a tab extending on the same side of said handle member as said member receiving portion and generally parallel thereto and angled slightly upwardly, said method comprising the steps of:

fixedly securing a portion of said flexible elongated member intermediate the tied-down ends thereof to said member receiving portion;

tensioning said flexible elongated member by rotating said member receiving portion thereby wrapping said elongated member about itself in overlapping relationship while maintaining said tied-down ends until said elongated member is tensioned;

maintaining the tension in said elongated member by hooking said tab under said tensioned elongated member on the side thereof opposing the untensioning of said elongated member; and subsequently untensioning said elongated member by releasing said tab.

14. The method of claim 13 wherein the step of fixedly securing includes the step of securing said portion of said flexible elonated member to said member receiving portion while maintaining the ends of said flexible elongated member in tied-down position.

15. The method of claim 13 further including the step of inserting an abutment member between said member receiving portion and said flexible elongated member on the side of said flexible elongated member opposing the untensioning thereof after the step of maintaining the tension; and subsequently removing the handle member from said member receiving portion.

16. A method for quickly and easily applying tension to the free ends of a pair of elongated members such as belts, straps, cables, ropes or the like when said flexible elongated members are tied down at the other ends thereof and quickly and easily releasing stored tension therefrom wherein said method includes an elongated handle member terminating at one end in a flexible elongated member receiving portion on one side of said handle member and at the other end in a tab extending on the same side of said handle member as said member receiving portion and generally parallel thereto and angled slightly upwardly, said method comprising the steps of:

placing the free ends of said pair of flexible elongated members in said member receiving portion;

tensioning said flexible elongated members by rotating said member receiving portion thereby wrapping said elongated members about themselves in overlapping relationship until said elongated members are tensioned;

maintaining the tension on said elongated members by hooking said tab under one of said tensioned elongated members on the side thereof opposing the untensioning of said last-mentioned elongated members and subsequently untensioning said elongated members by releasing said tab.

17. A method for quickly and easily applying tension to the free ends of an elongated flexible member wherein said elongated flexible member encircles a load or the like wherein said method includes an elongated handle member terminating at one end in a flexible elongated member receiving portion on one side of said handle member and at the other end in a tab extending on the same side of said handle member as said member receiving portion and generally parallel thereto and angled slightly upwardly, said method comprising the steps of:

placing the free ends of said flexible elongated member on said member receiving portion, tensioning said flexible elongated member by rotating said member receiving portion thereby wrapping the free ends of said elongated member about themselves in overlapping relationship said elongated member is tensioned;

maintaining the tension in said elongated member by hooking said tab under said tensioned elongated member on the side thereof opposing the untensioning of said elongated member;

subsequently untensioning said elongated member by releasing said tab.

* * * * *